United States Patent
Fujii et al.

(10) Patent No.: US 7,809,845 B2
(45) Date of Patent: Oct. 5, 2010

(54) APPARATUS AND METHOD FOR TRANSMITTING COMMAND

(75) Inventors: Kenichi Fujii, Kanagawa (JP); Masaki Shitano, Kanagawa (JP); Takashi Hirata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1055 days.

(21) Appl. No.: 10/937,362

(22) Filed: Sep. 10, 2004

(65) Prior Publication Data

US 2005/0060419 A1    Mar. 17, 2005

(30) Foreign Application Priority Data

Sep. 11, 2003   (JP) .............. 2003-320261

(51) Int. Cl.
*G06F 15/16* (2006.01)

(52) U.S. Cl. ............................. 709/230; 709/206

(58) Field of Classification Search ............ 709/206, 709/230; 340/825
See application file for complete search history.

(56) References Cited

U.S. PATENT DOCUMENTS

| | | | | |
|---|---|---|---|---|
| 4,855,905 A * | 8/1989 | Estrada et al. | ............... | 709/246 |
| 4,937,825 A * | 6/1990 | Ballard et al. | ............... | 714/712 |
| 4,991,133 A * | 2/1991 | Davis et al. | .................. | 709/234 |
| 5,187,708 A * | 2/1993 | Nakatani et al. | ............. | 370/469 |
| 5,710,761 A * | 1/1998 | Scott | ............................ | 370/252 |
| 6,157,465 A   | 12/2000 | Suda et al. | ................... | 358/407 |
| 6,222,855 B1 * | 4/2001 | Kimber et al. | .............. | 370/466 |
| 6,477,570 B1 | 11/2002 | Takayama et al. | ........... | 709/224 |
| 6,549,937 B1 * | 4/2003 | Auerbach et al. | ........... | 709/206 |
| 6,667,810 B1 | 12/2003 | Jeyachandran et al. | ...... | 358/1.14 |
| 6,775,023 B1 | 8/2004 | Fukunaga et al. | ........... | 358/1.15 |
| 7,068,663 B1 * | 6/2006 | Adler | ..................... | 370/395.51 |
| 7,467,018 B1 * | 12/2008 | Callaghan | ...................... | 700/1 |
| 7,701,958 B2 * | 4/2010 | Abrol et al. | .................. | 370/433 |
| 2002/0052966 A1 | 5/2002 | Isomura et al. | ............. | 709/230 |
| 2002/0118800 A1 * | 8/2002 | Martinez et al. | ........... | 379/67.1 |
| 2002/0161907 A1 * | 10/2002 | Moon | ........................... | 709/230 |
| 2002/0165975 A1 * | 11/2002 | Abbott | ....................... | 709/230 |
| 2002/0181497 A1 * | 12/2002 | Mano et al. | .................. | 370/466 |
| 2003/0093541 A1 * | 5/2003 | Lolayekar et al. | ........... | 709/230 |
| 2003/0204612 A1 * | 10/2003 | Warren | ....................... | 709/230 |
| 2004/0015409 A1 * | 1/2004 | Chittenden et al. | ............ | 705/26 |

FOREIGN PATENT DOCUMENTS

JP    2001-306416 A    11/2001
JP    2002-196990         7/2002

OTHER PUBLICATIONS

Japanese Office Action dated Nov. 20, 2007, regarding Japanese Patent Application 2003-320261.

* cited by examiner

*Primary Examiner*—Benjamin R Bruckart
*Assistant Examiner*—Gerald Smarth
(74) *Attorney, Agent, or Firm*—Fitzpatrick, Cella, Harper & Scinto

(57) ABSTRACT

There are provided an apparatus and method for transmitting commands in a network to which a plurality of communication protocols may be applied. A first command that supports a plurality of communication protocols is input. One of the plurality of communication protocols is selected in accordance with the input first command. The first command is converted into a corresponding second command in the selected communication protocol. The converted second command is transmitted using the selected communication protocol.

8 Claims, 10 Drawing Sheets

FIG. 4

| COMMAND NAME | INPUT PARAMETER LIST | OUTPUT PARAMETER LIST | PROCESSING ATTRIBUTE |
|---|---|---|---|
| PLAYER LIST ACQUISITION | NONE | DEVICE ID LIST | PARALLEL |
| STATUS ACQUISITION | DEVICE ID | STATUS INFORMATION | INDEPENDENT |
| PROFILE ACQUISITION | DEVICE ID | PROFILE INFORMATION | INDEPENDENT |
| SEARCH | STATUS INFORMATION + PROFILE INFORMATION + FLAG | DEVICE ID | SERIAL |
| ⋮ | ⋮ | ⋮ | ⋮ |

F I G. 5

| ITEM NAME | POSSIBLE VALUE | EXAMPLE OF VALUE |
|---|---|---|
| READY FLAG | "OK" WHEN DEVICE IS READY TO USE, "NG" WHEN DEVICE IS NOT READY TO USE | OK |
| BUSY FLAG | "NG" WHEN DEVICE IS BUSY, "OK" WHEN DEVICE IS NOT BUSY | NG |

FIG. 6

| ITEM NAME | POSSIBLE VALUE | EXAMPLE |
|---|---|---|
| ID | ID CHARACTER STRING THAT CAN IDENTIFY DEVICE | urn:abc.magnet:12345678 |
| MODEL NAME | CHARACTER STRING INDICATING TYPE OF DEVICE | PRINTER |
| MODEL NUMBER | CHARACTER STRING INDICATING MODEL NUMBER OF DEVICE | ABC Printer X123 |
| VENDOR | CHARACTER STRING INDICATING VENDOR OF DEVICE | ABC CORPORATION |
| ADDRESS | NETWORK ADDRESS OF DEVICE | 150.61.1.2 |
| OWNER | E-MAIL ADDRESS INDICATING OWNER OF DEVICE | User-name@abc.co.jp |

APPARATUS AND METHOD FOR TRANSMITTING COMMAND

FIELD OF THE INVENTION

The present invention relates to an apparatus and method for transmitting commands and, more particularly, to an apparatus and method for transmitting commands in a network to which a plurality of communication protocols may be applied.

BACKGROUND OF THE INVENTION

Along with the advance of the digital computer technology, even in office devices and general home appliances which have simple functions and cannot be organically connected to each other, functions such as connection of these devices, cooperation of processes, and the like can be implemented via a network. In order to connect a plurality of devices to each other via a network and to attain data transfer and operation control, a device control protocol is required. Device control protocols with various specifications have been proposed.

Office devices and home electronic appliances can be controlled via a network. As a result, device control applications which appropriately remotely control these devices to add new values continue to come on the market.

When a plurality of device control protocols of different types are used together, a device control application must individually support these device control protocols. As a technique that weakens coupling between such device control application processes and device control protocol processes, a prior art disclosed in, e.g., Japanese Patent Laid-Open No. 2001-306416 is known. In this prior art, even when there are differences depending on different vendors and versions (e.g., different communication protocols, different axial configurations of robots, and the like), common application software can be developed by simple replacement of processing commands.

However, in the aforementioned device control protocols, various specifications and proposals are available. That is, in device control protocols, specifications and bylaws are specified in correspondence with the types of devices to be controlled and the contents of expected cooperation processes. For this reason, with increasing number of classes of devices having cooperation functions via a network, the number of types of device control protocols increases. On the other hand, as shown in FIG. 10, since a device control application 101 and device 102 to be controlled are directly connected via a device control protocol 103, if the number of classes of devices to be controlled increases, the device control application must individually support a plurality of device control protocols.

SUMMARY OF THE INVENTION

It is an object of the present invention to make it unnecessary for a device control application to individually support a plurality of device control protocols.

It is another object of the present invention to implement an appropriate device cooperation process.

According to the present invention, an apparatus and method for transmitting commands in a network to which a plurality of communication protocols may be applied are provided. A first command that supports a plurality of communication protocols is input. One of the plurality of communication protocols is selected in accordance with the input first command. The first command is converted into a second command in the selected communication protocol. The converted second command is transmitted using the selected communication protocol.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 4 represents an example of the command configuration in a virtual protocol;

FIG. 5 represents an example of the configuration of status information;

FIG. 6 represents an example of the configuration of profile information;

DETAILED DESCRIPTION OF THE PREFERRED EMBODIMENTS

Preferred embodiments of the present invention will be described hereinafter with reference to the accompanying drawings. In the following description, a practical arrangement example will be explained. However, the present invention is not limited to such practical arrangement example.

Figure 1:
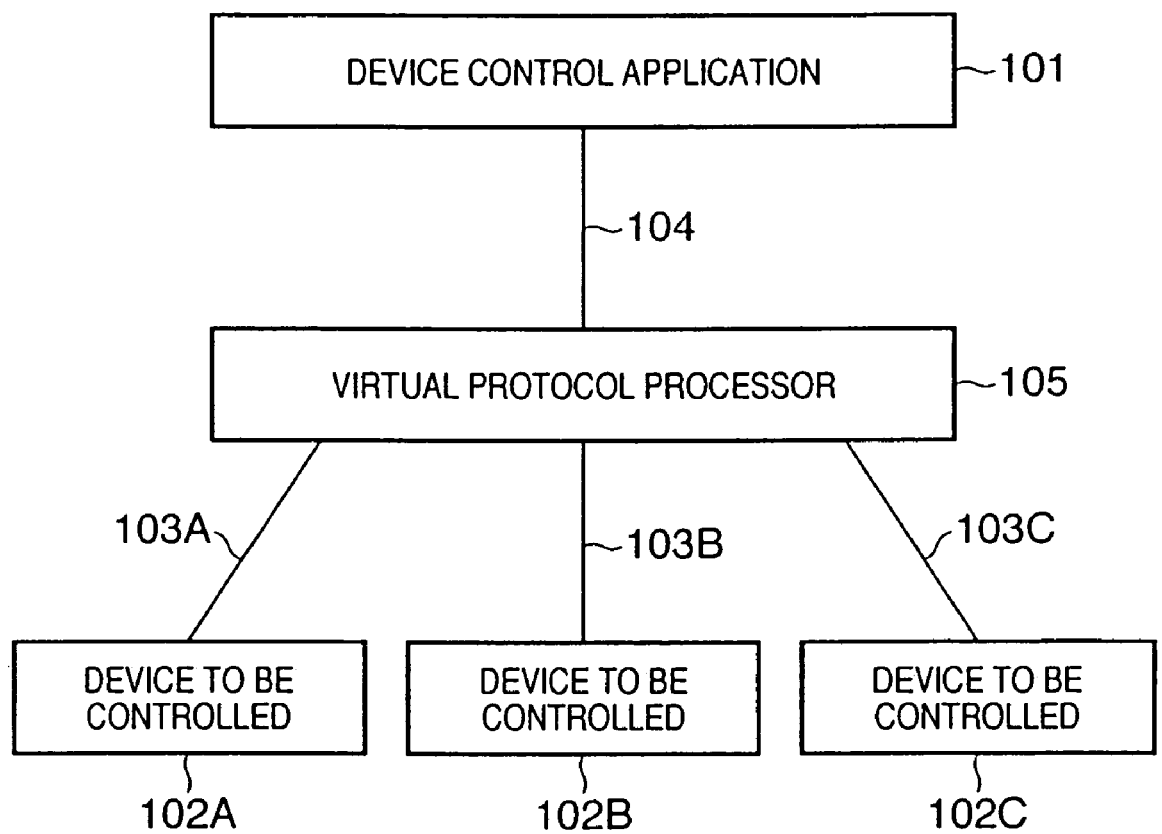
FIG. 1 is diagrammatically illustrates an embodiment of the basic concept of present invention.

FIG. 1 is diagrammatically illustrates an embodiment of the basic concept of present invention. This device control apparatus has a device control application 101 and virtual control protocol processor 105, and controls devices 102A to 102C to be controlled.

In this embodiment, the device control application 101 and device control protocols 103A to 103C have an indirect connection relationship via a virtual protocol 104. That is, a device control request output from the device control application 101 is supplied to the virtual protocol processor 105 via the virtual protocol 104 that generalizes functions required for device control, and is then supplied from the processor 105 to the devices 102A to 102C to be controlled via the plurality of device control protocols 103A to 103C.

Figure 2:
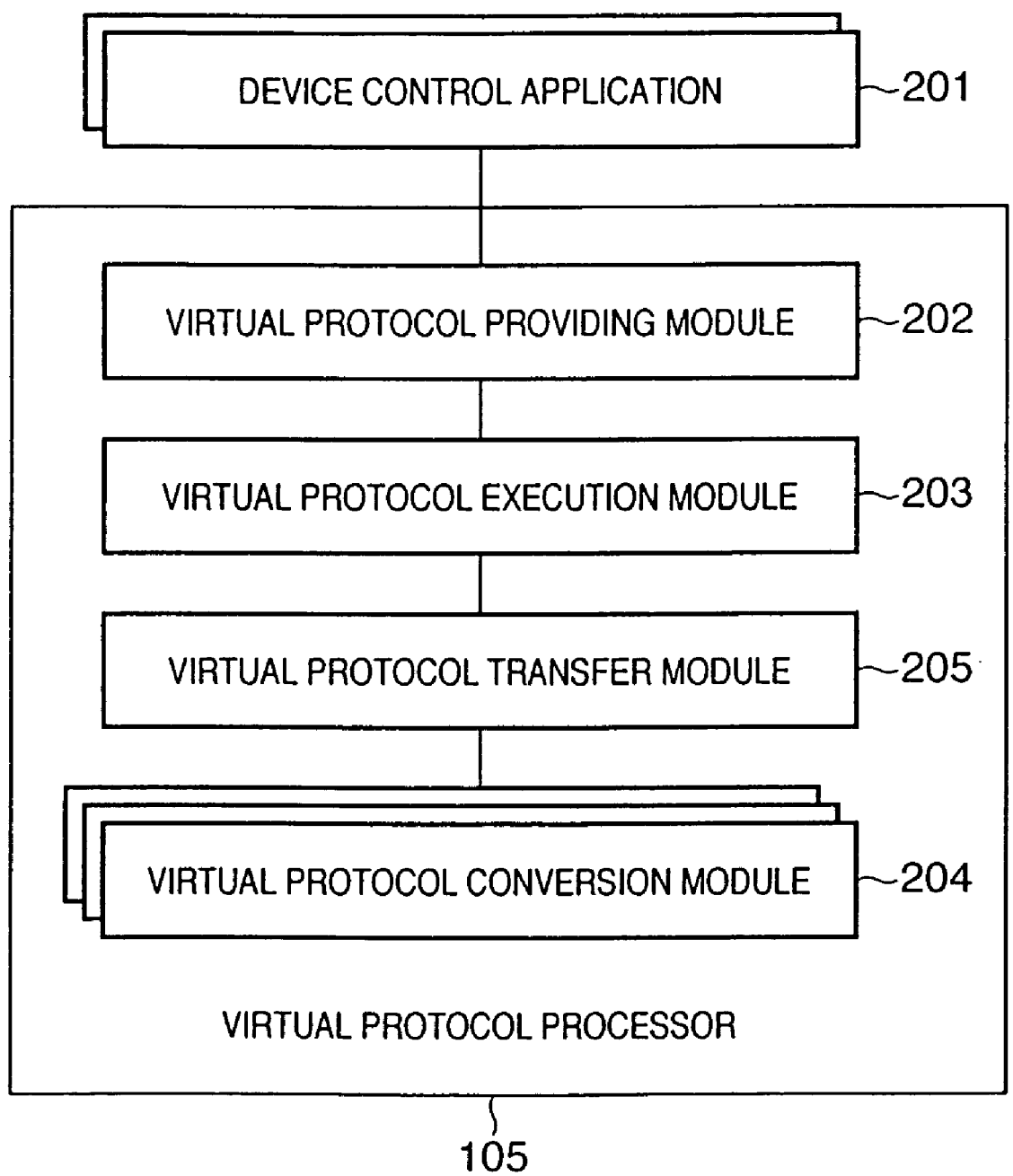
FIG. 2 is a block diagram showing the arrangement of a device control apparatus according to the embodiment of the present invention.

FIG. 2 is a block diagram showing the arrangement of the device control apparatus according to this embodiment.

Note that the device control apparatus is an information processing apparatus which comprises a CPU, ROM, RAM, and the like, and components 202 to 204 of the device control apparatus to be described below correspond to functions which are implemented when the CPU executes a control program stored in the ROM.

In FIG. 2, reference numeral 201 denotes a device control application (corresponding to the device control application 101 in FIG. 1), which implements a process that cannot be achieved by a single device by controlling a plurality of device network-compatible devices. A plurality of device control applications 201 may be present in the device control apparatus.

Modules 202 to 205 form the virtual protocol processor 105 shown in FIG. 1.

Reference numeral 202 denotes a virtual protocol providing module which provides a virtual protocol (corresponding to the virtual protocol 104 in FIG. 1) to the device control application 201. In other words, the module 202 provides an application programming interface via the virtual protocol.

Reference numeral 203 denotes a virtual protocol execution module which receives and interprets a device control request sent from the device control application 201 using the virtual protocol (corresponding to the virtual protocol 104 in FIG. 1) provided by the virtual protocol providing module 202, and determines control contents.

Reference numeral 204 denotes a virtual protocol conversion module, which converts the processing contents of the virtual protocol into those of a device control protocol used in device control. A plurality of virtual protocol conversion modules 204 are present in correspondence with the number of devices to be controlled, and can be arbitrarily added or deleted at the time of startup and during operation of the device control apparatus.

Reference numeral 205 denotes a virtual protocol transfer module which transfers the control contents determined by the virtual protocol execution module 203 to the virtual protocol conversion module 204. If there are a plurality of virtual protocol conversion modules 204, the virtual protocol transfer module 205 transfers the control contents determined by the virtual protocol execution module 203 to a corresponding one of the virtual protocol conversion modules 204.

As a communication protocol used in a communication route between each virtual protocol conversion module 204 and device to be controlled (corresponding to devices 102A to 102C to be controlled in FIG. 1), Internet protocol (IP) is used. As the IP version, both IPv4 and IPv6 can be used. A medium actually used as the communication route is a wired or wireless medium. Note that communication protocols such as TCP, UDP, HTTP, SMTP, SNMP, FTP, and the like may also be used in accordance with target device control protocols of the virtual protocol conversion modules 204. In order to assure communication security, IPsec, SSL, and the like may be used in correspondence with device control protocols.

Figure 3:
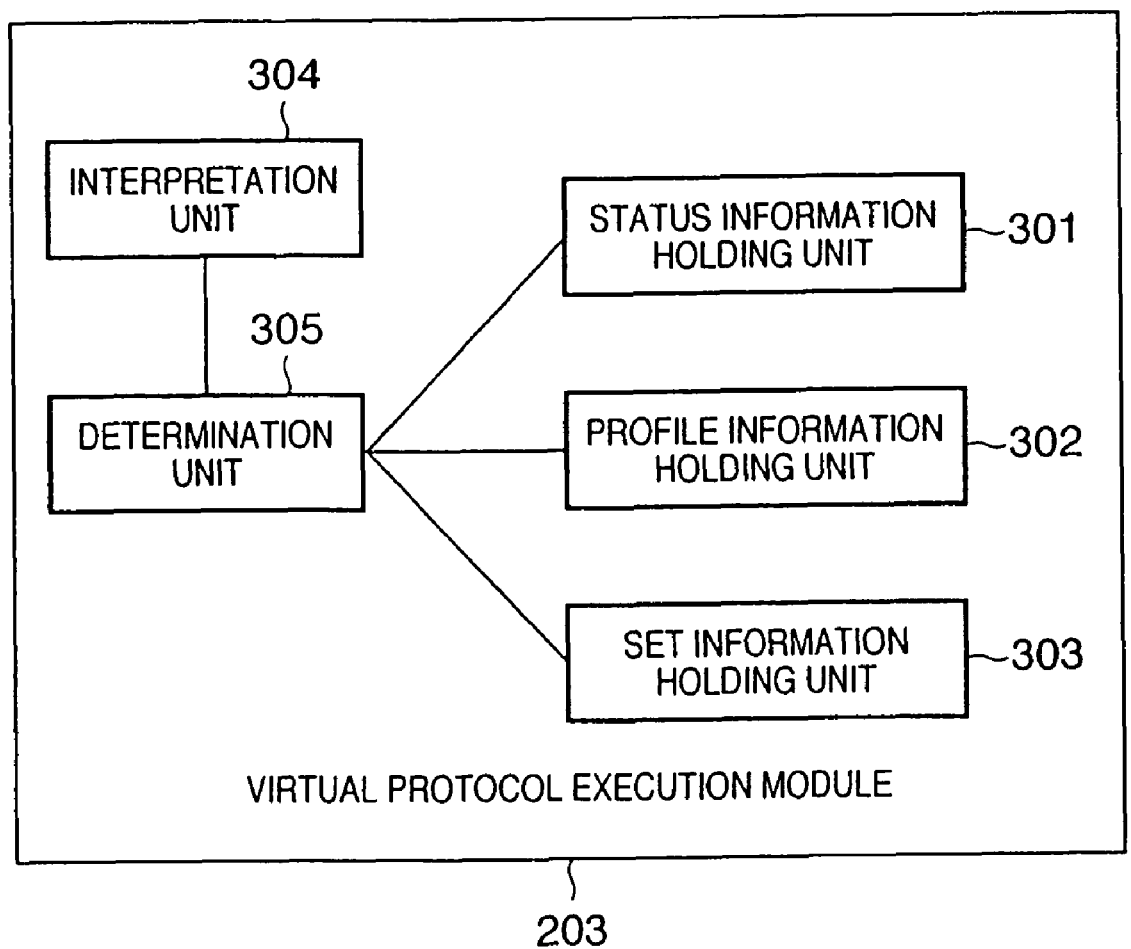
FIG. 3 is a block diagram showing the internal arrangement of a virtual protocol execution module.

FIG. 3 is a block diagram showing the internal arrangement of the virtual protocol execution module 203 shown in FIG. 2.

Reference numeral 301 denotes a status information holding unit which holds status information that indicates the status of a device to be controlled.

Reference numeral 302 denotes a profile information holding unit which holds profile information indicating the specifications of a device to be controlled.

Reference numeral 303 denotes a set information holding unit which holds information of a set of devices that can be manipulated in a device network.

Reference numeral 304 denotes an interpretation unit which interprets processing contents (a device control request sent from the device control application 201) expressed by the virtual protocol.

Reference numeral 305 denotes a determination unit which determines actual control contents on the basis of the interpretation result of the interpretation unit 304.

FIG. 4 illustrates an example of the command configuration in the virtual protocol.

The virtual protocol aims at providing means that generalizes functions required for device control, and is specified by extracting and reconstructing functions which may be required in device control from those of various protocols.

The virtual protocol includes a set of commands that command device control. Each command includes a plurality of pieces of information: a command name, input parameter list, output parameter list, and processing attribute. The command name is an identification name of a command as the most basic element that forms the virtual protocol. The input parameter list is a list of information required on the device control application side upon executing a command. The output parameter list is a list of information of processing results obtained after execution of a command. The processing attribute guide information upon developing a command to a plurality of actual device control protocols. A command is developed by the determination unit 305 shown in FIG. 5 on the basis of the processing attribute.

For example, UPnP, JXTA, and the like have common functions such as search and the like, but these functions are processed using different names and parameters. FIG. 4 laps (abstracts) to process such functions by identical names and parameters. However, since a peer-to-peer protocol such as JXTA includes functions such as message routing and the like, which are not related to device control, these functions are omitted. Since the virtual protocol itself is "virtual definition of device-to-device exchange", specifications of "name" (command name) of each function, "input" for that function, and "output" of the result are defined in FIG. 4.

FIG. 4 illustrates commands associated with device discovery and recognition functions as especially principal functions of those implemented by the virtual protocol.

In FIG. 4, a "player list acquisition" command is one of device information acquisition commands, and is used to acquire set information of available devices which are present on the device network. The acquired device set information is held by the set information holding unit 303 shown in FIG. 3. An execution result of this command is acquired as a list of identification codes ID indicating available devices present on the device network (this list includes the acquired identification codes ID and device control protocols used to acquire these identification codes ID). As the processing attribute of this command, "parallel" is appended. With this attribute, when there are a plurality of virtual protocol conversion modules 204 corresponding to a plurality of different types of actual device control protocols, a player list acquisition instruction is parallelly and simultaneously issued to all the virtual protocol conversion modules 204.

In FIG. 4, a "status acquisition" command is also one of device information acquisition commands, and is used to acquire status information which indicates the status of a device corresponding to an ID designated in the input parameter list. The status information is held by the status information holding unit 301 shown in FIG. 3. The device ID is designated by the input parameter list, and status information of the device with the designated ID is input to the output parameter list. As the processing attribute of this command, "independent" is appended. With this attribute, even when there are a plurality of virtual protocol conversion modules 204 corresponding to a plurality of different types of actual device control protocols, a status acquisition instruction is issued to only the virtual protocol conversion module 204 corresponding to the device with the designated ID.

In FIG. 4, a "profile acquisition" command is also one of device information acquisition commands, and is used to acquire profile information which indicates the specification of a device corresponding to an ID designated in the input parameter list. The profile information is held by the profile information holding unit 302 shown in FIG. 3. The device ID is designated by the input parameter list, and profile information of the device with the designated ID is input to the output parameter list. As the processing attribute of this command, "independent" is appended. With this attribute, even when there are a plurality of virtual protocol conversion modules 204 corresponding to a plurality of different types of actual device control protocols, a profile acquisition instruction is issued to only the virtual protocol conversion module 204 corresponding to the device with the designated ID.

In FIG. 4, a "search" command is used to search for a device with the designated performance/specification (described in profile) or status (described in status). Status information, profile information, and a flag indicating information to be used in a search are input to the input parameter list. Only one device ID obtained as a result of the search is input to the output parameter list. As the processing attribute of this command, "serial" is appended. With this attribute, when there are a plurality of virtual protocol conversion modules 204 corresponding to a plurality of different types of actual device control protocols, a search instruction is issued in turn to each of the plurality of virtual protocol conversion modules 204 until a device with the designated performance/specification or status is found.

FIG. 5 illustrates an example of the configuration of the status information.

The status information is used to indicate the status of a device, and includes a ready flag and busy flag.

The ready flag indicates whether or not a corresponding device is ready to use. For example, if a device is ON, the ready flag is "OK"; otherwise, it is "NO".

The busy flag indicates whether or not the process of a corresponding device is now in progress. For example, if a device is a printer and its print process is in progress, the busy flag is "NG"; otherwise, it is "OK".

FIG. 6 illustrates an example of the configuration of the profile information.

The profile information is used to publish the specification indicating performance and the like of a device, and includes, e.g., ID, model name, model number, vendor, address, and owner data.

The ID data is a character string used to uniquely identify a physical entity of a device. For example, the ID data is "urn:abc-magnet:12345678".

The model name data is a character string indicating the type of device. For example, the model name data is "printer".

The model number data is a character string indicating the model number of a device. For example, the model number data is "ABC Printer X123".

The vendor data is a character string indicating the vendor of a device. For example, the vendor data is "ABC corporation".

The address data indicates an address of the device n the device network. For example, when TCP/IP is used, the address data is "150.61.1.2".

The owner data indicates the owner of a device. For example, if an e-mail address is used, the owner data is "User-name@abc.co.jp".

Figure 7:
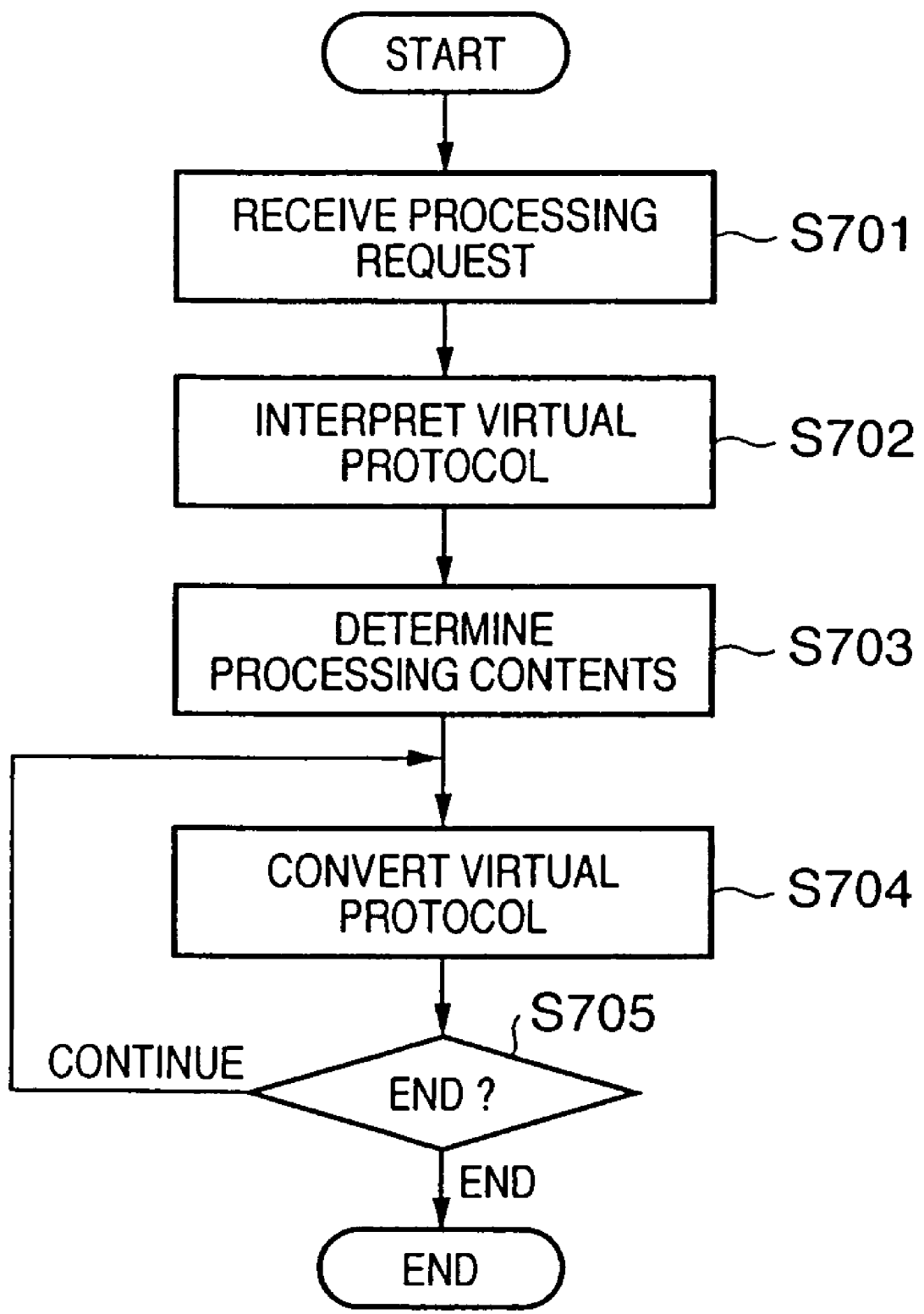
FIG. 7 is a flowchart showing a principal sequence of a device control process executed by the device control apparatus.

FIG. 7 is a flowchart showing a principal sequence of the device control process executed by the device control apparatus.

In step S701, a processing request (device control request) sent from the device control application 201 is accepted using the virtual protocol provided by the virtual protocol providing module 202.

In step S702, the virtual protocol execution module 203 interprets the processing request (processing contents expressed by the virtual protocol) sent from device control application 201 via the virtual protocol. Especially, this process is executed by the interpretation unit 304 in the virtual protocol execution module 203. For example, when a "status acquisition" command is issued as the virtual protocol from the device control application 201, the unit 304 determines with reference to the virtual protocol table shown in FIG. 4 that the device ID is required as an input parameter of the command, and status information is required as an output parameter.

In step S703, the virtual protocol execution module 203 determines actual control contents on the basis of the interpretation result of the interpretation unit 304. Especially, this process is executed by the determination unit 305 in the virtual protocol execution module 203. That is, in the above example, on the basis of the interpretation result, i.e., "input=device ID" and "output=status information" in the status acquisition command interpreted by the interpretation unit 304, the unit 305 searches the set information holding unit 303 using the device ID to determine a device control protocol actually used by the device with that ID, and determines that the corresponding virtual protocol conversion module 204 is selected to issue a status acquisition processing request according to the determined device control protocol.

In step S704, the control contents determined by the determination unit 305 are converted into the processing contents of the device control protocol used in actual device control. This process is executed by a corresponding one of the plurality of virtual protocol conversion modules 204, which receives the control contents via the virtual protocol transfer module 205.

It is checked in step S705 on the basis of the control contents determined in step S703 if an end condition is met. If the end condition is not met, the flow advances to step S704 to execute the same process for another device control protocol. On the other hand, if the end condition is met, this device control process ends.

Note that the end condition reflects the contents (parallel, independent, serial) of the processing attribute shown in FIG. 4, and is checked by the determination unit 305. In case of this "status acquisition" command, since the processing attribute is "independent", the process ends.

For example, if there are two device control protocols, i.e., UPnP and JXTA, and if a "player list acquisition" command, which instructs to "list up currently ready devices", is issued as one of device information acquisition commands, is issued, both the UPnP and JXTA protocols are selected. The corresponding protocol conversion modules 204 convert the device information acquisition command into a UPnP device discovery command and JXTA peer discovery command. At this time, since an action to "discover a device" has no order of superiority between the protocols, both the UPnP and JXTA protocols "simultaneously (parallelly)" issues device discovery commands (UPnP device discovery command and JXTA peer discovery command).

By contrast, when a "search" command, which instructs to "search for a device", as one of the device information acquisition commands, is issued, both the UPnP and JXTA protocols are selected. However, if the corresponding device is found, the process can be aborted at that time. Hence, the process is "sequentially (serially)" executed so that a search is conducted using the UPnP protocol as one of the selected protocols, and a search is conducted using the other JXTA protocol if a device cannot be found. Or if a command (profile acquisition) that instructs to "acquire predetermined information of a device" comes from the virtual protocol, since this command need only be issued by the protocol that can connect the device, a process is independently (if the protocol that can connect the device is UPnP, UPnP alone) (the process is done based on the processing attribute of FIG. 4).

In this manner, in an environment in which a plurality of device control protocols of different types are used together, when a process is converted from one virtual protocol into a plurality of actual protocols (device control protocols), these actual protocols are executed parallelly, serially, or independently, thereby controlling the order or contents of processes.

Figure 8:
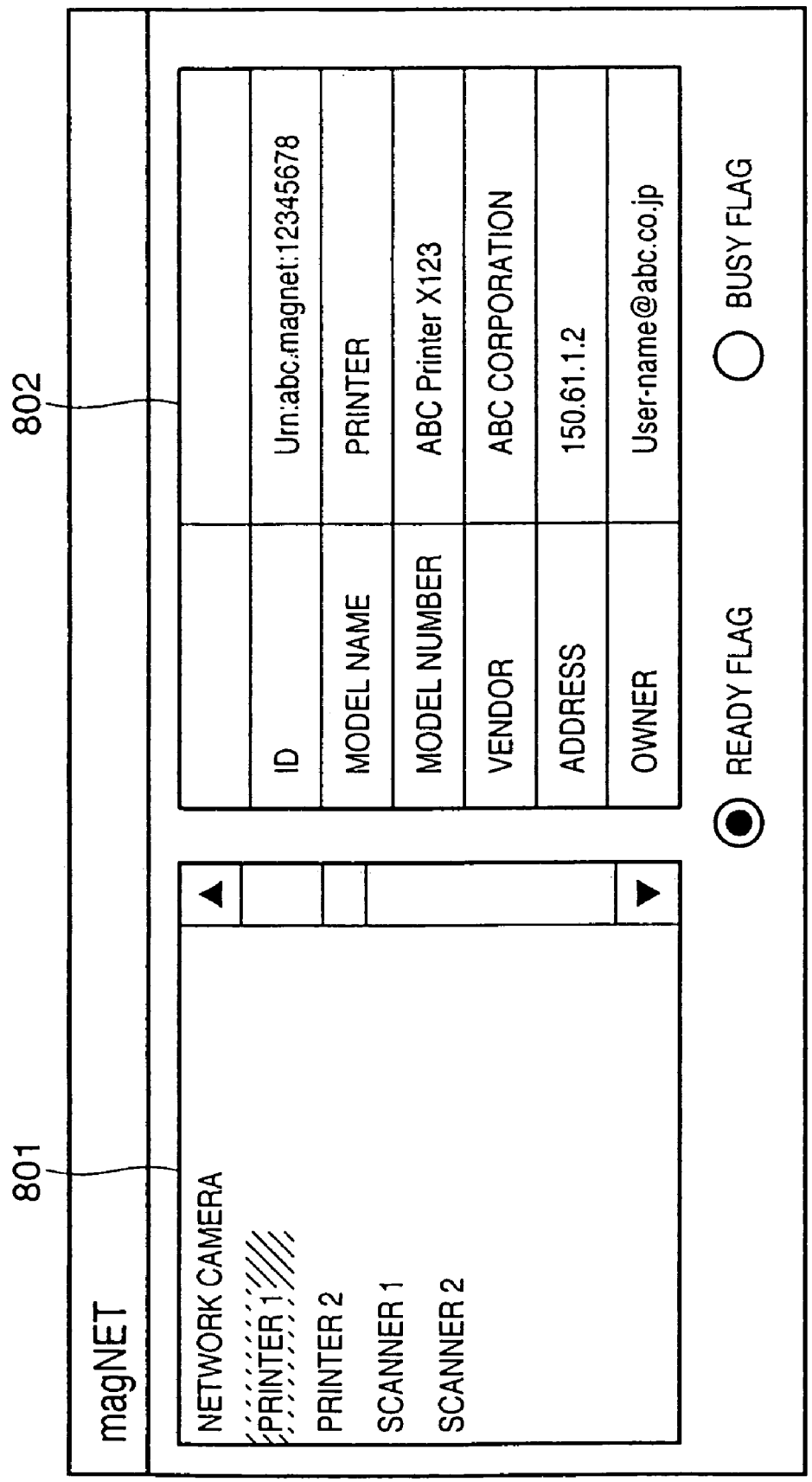
FIG. 8 represents an example of a user interface of a device control application.

FIG. 8 illustrates an example of a user interface of the device control application 201.

In this embodiment, virtual protocol conversion modules 204, which respectively correspond to three different device control protocols "plug & play", "peer 2 peer", and "directory server", are prepared.

FIG. 8 represents a window displayed on an image display device of the information processing apparatus on which the device control application 201 runs. This window displays a list 801 of devices which form the device network in this embodiment, profile information 802, and status information 803.

The list 801 corresponds to the device ID list which is input to the output parameter list upon execution of the "player list acquisition" command shown in FIG. 4. In this case, the window indicates that devices with device IDs=network camera, printer 1, printer 2, printer, scanner 1, and scanner 2 are ready to use. The profile information 802 and status information 803 are displayed using profile information (FIG. 6) and status information (FIG. 5) which are input to the output parameter lists as a result of execution of the "profile acquisition" command and "status acquisition" command shown in FIG. 4 on the basis of a device (printer 1) selected from those displayed on the list 801.

The user selects and designates a desired device from a list of controllable devices displayed as the list 801, and can enjoy a service provided by that device.

Figure 9:
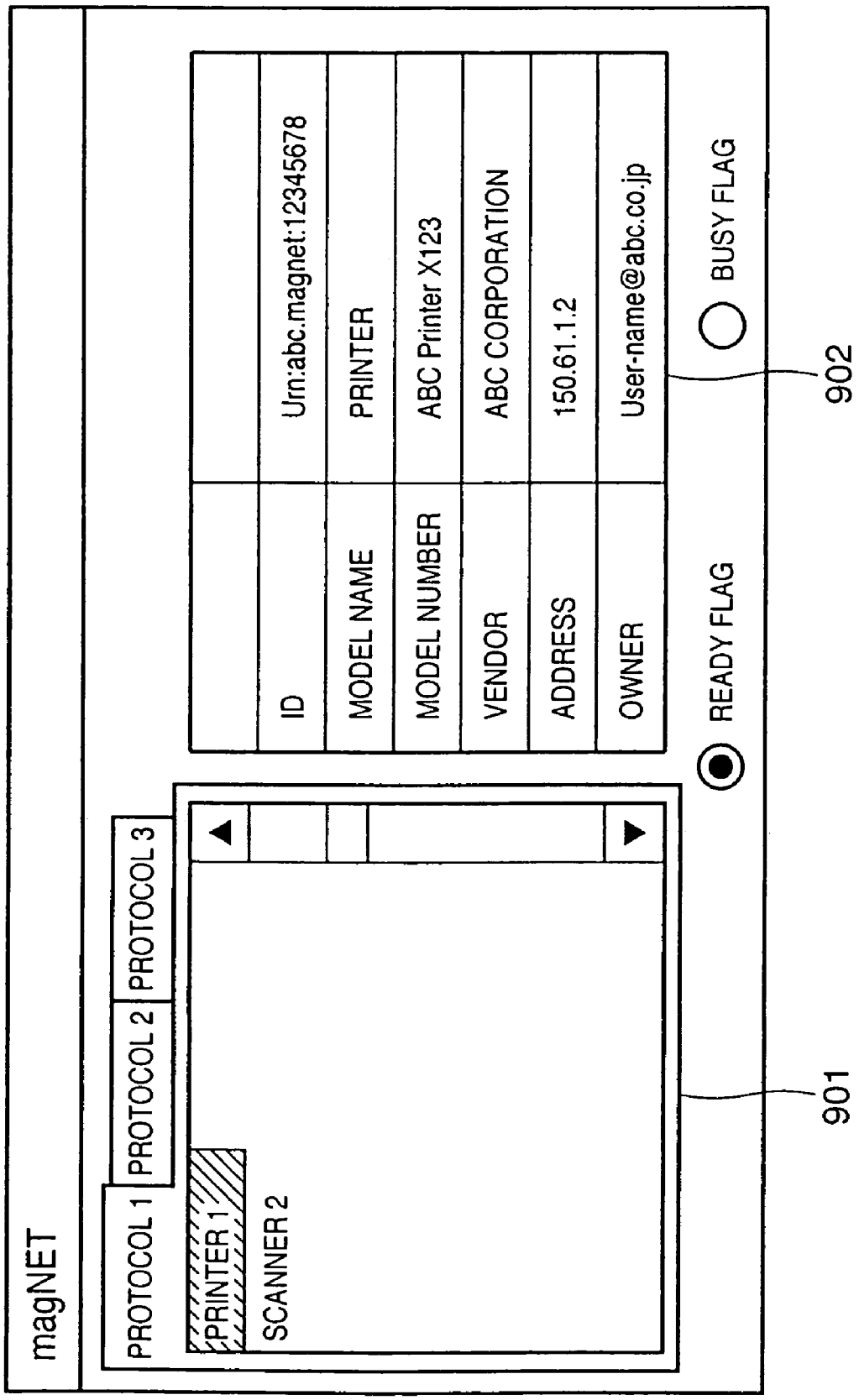
FIG. 9 represents another example of a user interface of a device control application.
Figure 10:
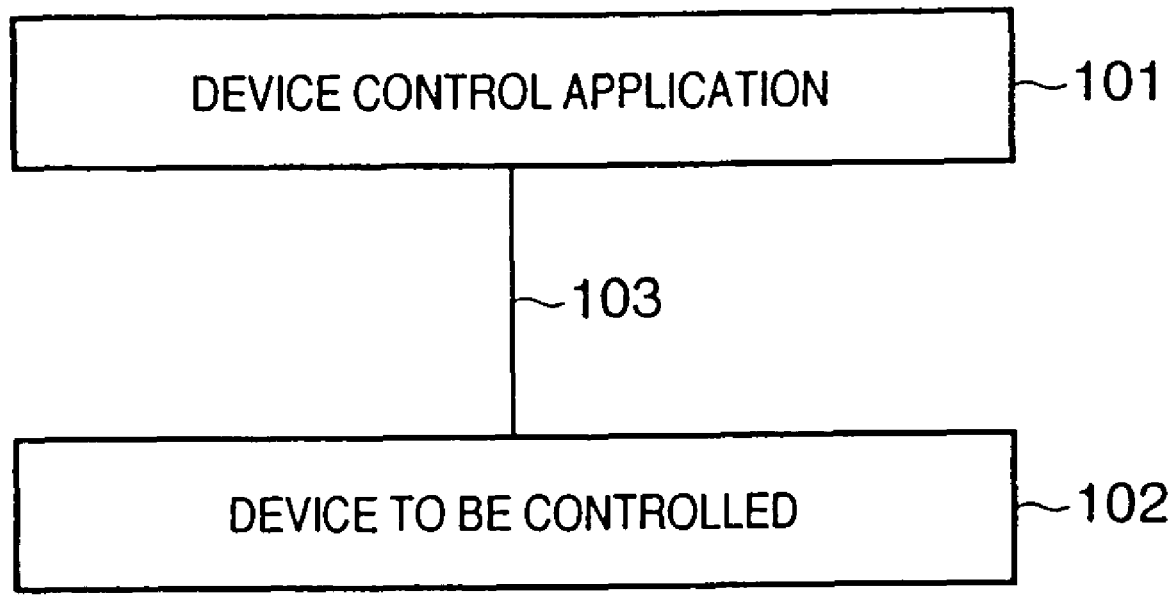
FIG. 10 is a block diagram showing the conventional connection relationship among a device control application, device control protocol, and device to be controlled.

FIG. 9 illustrates another example of a user interface of the device control application 201.

A plurality of device control protocols have different properties and performances. A user interface suited to the user who wants to manipulate the device control application while utilizing the characteristics unique to each individual device control protocol is that shown in FIG. 9. FIG. 9 also shows a window which is displayed on the image display device of the information processing apparatus on which the device control application 201 runs. This window displays a device list 901, profile information 902, and status information 903. The device list 901 displays devices that form a device network while being classified into corresponding device control protocols (protocols 1, 2, and 3). In FIG. 9, devices corresponding to protocol 1 are displayed. The profile information 902 and status information 903 display profile information and status information associated with "printer 1" displayed on the device list 901.

In this manner, the user can select a device in consideration of the profile/status information of devices to be controlled in addition to the identification information of the device control protocol.

As described above, since the relationship between the device control protocol and device control application is changed to loose coupling via the virtual protocol, devices which support different types of device control protocols can form a device network.

Since the order and contents of processes in an environment in which a plurality of device control protocols of different types are used together can be controlled, more appropriate device cooperation processes can be realized.

Furthermore, the device control application need not independently support a plurality of device control protocols of different types.

The present invention has been described by way of its preferred embodiments. However, the present invention is not limited to the above embodiment, and various modifications can be made within the scope of the claims.

In the above embodiment, Internet protocol (IP) is used as the communication protocol used in the communication route between each virtual protocol conversion module 204 and device to be controlled. Instead of this protocol, other communication protocols that can connect devices each other may be used. For example, IPX may be used.

In the above embodiment, a single device control apparatus controls a plurality of devices to be controlled. Alternatively, a plurality of device control apparatuses and a plurality of devices to be controlled may be present on a single device network.

In the above embodiment, one device control protocol corresponds to one virtual protocol conversion module 204. Alternatively, a plurality of device control protocols may correspond to one virtual protocol conversion module 204. Or an arrangement that allow a plurality of virtual protocol conversion modules 204 to implement control of one device control protocol may be adopted.

Note that the present invention may be applied to either a system constituted by a plurality of devices (e.g., an AV device, home electronic appliance, computer device, interface device, and the like), or a single apparatus.

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a flexible disk, hard disk, optical disk, magneto-optical disk, CD-ROM, CD-R, CD-RW, DVD-ROM, DVD-RAM, DVD-RW, DVD+RW, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2003-320261 filed on Sep. 11, 2003, which is hereby incorporated by reference herein.

What is claimed is:

1. An apparatus for transmitting a command in a network to which a plurality of types of communication protocols may be applied, including at least a first type of communication protocol and a second type of communication protocol, the apparatus comprising:
   an inputting unit configured to input a command of a third type of communication protocol;
   a central processor coupled to a memory, the central processor including:
   a determining unit configured to determine whether the command input by the inputting unit is a search command to search for a device in the network or a control command to control the device, and
   a conversion unit configured to convert the command input by the inputting unit into a plurality of search commands corresponding to the plurality of types of communication protocols, if the determining unit determines that the command input by the inputting unit is the search command;
   a transmission unit configured to transmit the plurality of search commands across the network to the device in the network; and
   a receiving unit configured to receive a response transmitted across the network, in response to at least one of the plurality of search commands, by the device in the network,
   wherein the central processor further includes an associating unit configured to associate identification information corresponding to the device and identification information corresponding to the first type of communication protocol, if the response received by the receiving unit is transmitted by the device in response to the command of the first type of communication protocol, and to associate the identification information corresponding to the device and identification information corresponding to the second type of communication protocol, if the response received by the receiving unit is transmitted by the device in response to the command of the second type of communication protocol,
   wherein the conversion unit converts the command input by the inputting unit into a control command used in the first type of communication protocol and the transmission unit transmits the control command used in the first type of communication protocol to the device, if the determining unit determines that the command input by the inputting unit is the control command to control the device and determines that the identification information corresponding to the device and the identification information corresponding to the first type of communication protocol have been associated by the associating unit,
   wherein the conversion unit converts the command input by the inputting unit into a control command used in the second type of communication protocol and the transmission unit transmits the control command used in the second type of communication protocol to the device, if the determining unit determines that the command input by the inputting unit is the control command to control the device and determines that the identification information corresponding to the device and the identification information corresponding to the second type of communication protocol have been associated by the associating unit,
   wherein the conversion unit converts the command input by the inputting unit into a device search command used in the first type of communication protocol, and converts the command input by the inputting unit into a device search command used in the second type of communication protocol, if the determining unit determines that the command is a device search command to search for a device that satisfies a condition,
   wherein the transmission unit transmits the device search command used in the first type of communication protocol via the network, and the transmission unit transmits the device search command used in the second type of communication protocol via the network, if a response to the search command used in the first type of communication protocol is not received by the receiving unit from the device that satisfies the condition, and
   wherein the transmission unit transmits the device search command used in the first type of communication protocol via the network, and does not transmit the search command used in the second type of communication protocol via the network, if a response to the device search command used in the first type of communication protocol is received by the receiving unit from the device that satisfies the condition.

2. The apparatus according to claim 1, wherein:
   the conversion unit converts the command input by the inputting unit into a control command to acquire information used in the first type of communication protocol, if the determining unit determines that the command is the control command to control the device, determines that the command is for acquiring information from the device, and determines that the identification information corresponding to the device and the identification information corresponding to the first type of communication protocol have been associated by the associating unit, and
   the transmission unit transmits the control command to acquire information used in the first type of communication protocol.

3. The apparatus according to claim 2, wherein the information acquired in response to the control command to acquire information used in the first type of communication protocol is status or profile information corresponding to the device.

4. The apparatus according to claim 2, further comprising a display unit configured to display the information corresponding to the device acquired in response to the control command to acquire information used in the first type of communication protocol.

5. A method performed by a transmission apparatus, for transmitting a command in a network to which a plurality of types of communication protocols may be applied, including at least a first type of communication protocol and a second type of communication protocol, the method comprising:
   inputting a command of a third type of communication protocol;
   utilizing a central processor to determine whether the command of the third type of communication protocol is a search command to search for a device in the network or a control command to control the device;

utilizing the central processor to convert the command of the third type of communication protocol into a plurality of search commands corresponding to the plurality of types of communication protocols, if the command of the third type of communication protocol is determined to be the search command;

transmitting the plurality of search commands across the network to the device in the network;

receiving a response transmitted across the network, in response to at least one of the plurality of search commands, by the device on the network; and utilizing the central processor to associate identification information corresponding to the device and identification information corresponding the first type of communication protocol, if the response is transmitted by the device in response to the command of the first type of communication protocol, and to associate the identification information corresponding to the device and identification information corresponding to the second type of communication protocol, if the response is transmitted by the device in response to the command of the second type of communication protocol, wherein the command of the third type of communication protocol is converted into a control command used in the first type of communication protocol and the control command used in the first type of communication protocol is transmitted, if the command of the third type of communication protocol is determined to be the control command to control the device and the identification information corresponding to the device is determined to be associated with the identification information corresponding to the first type of communication protocol, wherein the command of the third type of communication protocol is converted into a control command used in the second type of communication protocol and the control command used in the second type of communication protocol is transmitted, if the command of the third type of communication protocol is determined to be the control command to control the device and the identification information corresponding to the device is determined to be associated with the identification information corresponding to the second type of communication protocol, wherein the command of the third type of communication protocol is converted into a device search command used in the first type of communication protocol, and the command of the third type of communication protocol is converted into a device search command used in the second type of communication protocol, if the command is determined to be a device search command to search for a device that satisfies a condition, wherein the device search command used in the first type of communication protocol is transmitted via the network, and the device search command used in the second type of communication protocol is transmitted via the network, if a response to the search command used in the first type of communication protocol is not received from the device that satisfies the condition, and wherein the device search command used in the first type of communication protocol via the network, and the device search command used in the second type of communication protocol is not transmitted via the network, if a response to the device search command used in the first type of communication protocol is received by the receiving unit from the device that satisfies the condition.

6. The method according to claim 5, wherein:

the command of the third type of communication protocol is converted into a control command to acquire information used in the first type of communication protocol, if the command of the third type of communication protocol is determined to be the control command to control the device, the command is determined to be for acquiring information from the device, and the identification information corresponding to the device and the identification information corresponding the first type of communication protocol are determined to have been associated, and the control command to acquire information used in the first type of communication protocol is transmitted.

7. A non-transient computer-readable storage medium storing a program that is executable by a computer to perform a method of transmitting a command in a network to which a plurality of types of communication protocols may be applied, including at least a first type of communication protocol and a second type of communication protocol, the method comprising:

inputting a command of a third type of communication protocol; and determining whether the command of the third type of communication protocol is a search command to search for a device in the network or a control command to control the device;

converting the command of the third type of communication protocol into a plurality of search commands corresponding to the plurality of types of communication protocols, if the command of the third type of communication protocol is determined to be the search command;

transmitting the plurality of search commands across the network to the device in the network;

receiving a response transmitted across the network, in response to at least one of the plurality of search commands, by the device in the network; and associating identification information corresponding to the device and identification information corresponding to the first type of communication protocol, if the response is transmitted by the device in response to the command of the first type of communication protocol, and associating the identification information corresponding to the device and identification information corresponding to the second type of communication protocol, if the response is transmitted by the device in response to the command of the second type of communication protocol, wherein the command of the third type of communication protocol is converted into a control command used in the first type of communication protocol and the control command used in the first type of communication protocol is transmitted, if the command of the third type of communication protocol is determined to be the control command to control the device and the identification information corresponding to the device is determined to be associated with the identification information corresponding to the first type of communication protocol, wherein the command of the third type of communication protocol is converted into a control command used in the second type of communication protocol and the control command used in the second type of communication protocol is transmitted, if the command of the third type of communication protocol is determined to be the control command to control the device and the identification information corresponding to the device and the identification information corresponding to the second type of communication protocol are determined to be associated, wherein the command of the third type of communication protocol is converted into a device search command used in the first type of communication protocol, and the command of the third type of communication protocol is converted into a device search command used in the second type of communication protocol, if the command of the third type of communication protocol is determined to be a device search command to search for a device that satisfies a condition, and wherein the device search command used in the first type of communication protocol is transmitted via the network, and the device search command used is transmitted via the second type of communication protocol in the network, if a response to the search command used in the first type of communication protocol is not received from the device that satisfies the condition, and wherein the device search command used in the first type of communication protocol is transmitted via the network, and the device search command used in the second type of communication protocol is not transmitted via the network, if a response to the device search command used in the first type of communication protocol is received from the device that satisfies the condition.

8. The storage medium according to claim 7, wherein:

the command of the third type of communication protocol is converted into a control command to acquire information used in the first type of communication protocol, if the command of the third type of communication protocol is determined to be the control command to control the device, the command is determined to be for acquiring information from the device, and the identification information corresponding to the device and the identification information corresponding to the first type of communication protocol are determined to be associated, and the control command to acquire information used in the first type of communication protocol is transmitted.

* * * * *